(12) United States Patent
Harper

(10) Patent No.: US 7,918,188 B1
(45) Date of Patent: Apr. 5, 2011

(54) CAGE WITH REVERSIBLY MOUNTED DOOR

(75) Inventor: Mike Harper, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 12/625,099

(22) Filed: Nov. 24, 2009

(51) Int. Cl.
*A01K 31/10* (2006.01)
(52) U.S. Cl. .................................................. 119/481
(58) Field of Classification Search .................. 119/452, 119/481, 501, 524; 49/382, 193
See application file for complete search history.

(56) References Cited

U.S. PATENT DOCUMENTS

| | | |
|---|---|---|
| 969,285 A | 9/1910 | Keipper |
| 1,187,875 A | 6/1916 | Welty |
| 1,198,524 A | 9/1916 | Cunliffe |
| 2,456,419 A | 12/1948 | Jackson et al. |
| 2,892,562 A | 6/1959 | Smithson |
| 3,298,135 A * | 1/1967 | Kinser ............................ 49/380 |
| 3,321,100 A | 5/1967 | Toma |
| 3,386,209 A | 6/1968 | Starcevic |
| 3,455,061 A | 7/1969 | Kesling et al. |
| 3,556,058 A | 1/1971 | Smiler |
| 3,749,061 A | 7/1973 | Connelly |
| 3,896,766 A | 7/1975 | Martin |
| 4,016,833 A | 4/1977 | Ray |
| 4,466,676 A | 8/1984 | Nilsson |
| 4,475,309 A | 10/1984 | Porter |
| 4,484,540 A | 11/1984 | Yamamoto |
| 4,503,582 A | 3/1985 | Gurubatham |
| 4,762,085 A | 8/1988 | Ondrasik |
| 4,763,606 A | 8/1988 | Ondrasik, II |
| 4,917,047 A | 4/1990 | Wazeter, III |
| 5,036,795 A | 8/1991 | Houghton |
| 5,476,066 A | 12/1995 | Hoffman |
| 5,544,619 A | 8/1996 | Braum |
| 5,549,073 A | 8/1996 | Askins et al. |
| 5,626,098 A | 5/1997 | Askins et al. |
| 5,660,291 A | 8/1997 | Dash |
| 5,669,331 A | 9/1997 | Richmond |
| 5,727,502 A | 3/1998 | Askins et al. |
| 5,803,018 A | 9/1998 | Liou |
| 5,943,982 A | 8/1999 | Askins et al. |
| 6,192,834 B1 | 2/2001 | Kolozsvari |

(Continued)

FOREIGN PATENT DOCUMENTS

DE 29704519 6/1997

(Continued)

*Primary Examiner* — Timothy D Collins
*Assistant Examiner* — Monica Williams
(74) *Attorney, Agent, or Firm* — Dorsey & Whitney LLP

(57) ABSTRACT

A cage for housing an animal includes a top wall, bottom, first and second sidewalls, a front wall and a rear wall. A door is disposed in at least one of the walls and is hinged for movement between an open and closed position. The door is mounted in a wall having a doorway. The door includes a plurality of loops on each side of the door. The wall includes a plurality of loops along each side of the doorway. The door loops are positionable adjacent the wall loops when the door is disposed within the doorway to form mating hinge structures. A hinge pin is selectively insertable into either of the door loops on one edge of the door together with the corresponding loops on the wall, to thereby hingedly mount the door to the wall for door swinging movement in either a first direction or a second direction with respect to the wall.

4 Claims, 3 Drawing Sheets

| U.S. PATENT DOCUMENTS | | | | FOREIGN PATENT DOCUMENTS | | |
|---|---|---|---|---|---|---|
| 6,293,229 B1 | 9/2001 | Edstrom, Sr. | | FR | 2345074 A | 11/1977 |
| 6,345,591 B1 * | 2/2002 | Richmond | 119/497 | GB | 2366177 | 6/2002 |
| 6,484,672 B1 | 11/2002 | Versaw | | | | |
| 6,681,720 B1 | 1/2004 | Skurdalsvold et al. | | * cited by examiner | | |

# CAGE WITH REVERSIBLY MOUNTED DOOR

TECHNICAL FIELD OF THE INVENTION

The present invention relates to animal cages, and more particularly to a cage with a reversibly mounted door

BACKGROUND ART OF THE INVENTION

Often times pet owners desire to place their pets inside a temporary housing to separate a pet from its normal environment. In response, various cage designs have been created. The cages have one or more doors hinged to an opening of the cage. The door can be secured to the opening with hinges either to the right or left side of the opening, which ever is most convenient; however, these cages are limited to movement of the door in one direction. This limitation can be problem in use of a cage during transportation of an animal, or where the cage is used in a restricted area where a door can only be opened in one direction.

A need has thus arisen for an improved animal cage.

SUMMARY OF THE INVENTION

In accordance with the present invention, a cage for housing an animal is provided. The cage includes a top wall, bottom, first and second sidewalls, a front wall and a rear wall. A door is disposed in at least one of the walls and is hinged for movement between an open and closed position. The door is mounted in a wall having a doorway. The door includes a plurality of loops on each side of the door. The wall includes a plurality of loops along each side of the doorway. The door loops are positionable adjacent the wall loops when the door is disposed within the doorway to form mating hinge structures. A hinge pin is selectively insertable into either of the door loops on one edge of the door together with the corresponding loops on the wall, to thereby hingedly mount the door to the wall for door swinging movement in either a first direction or a second direction with respect to the wall.

BRIEF DESCRIPTION OF THE DRAWINGS

For a more complete understanding of the present invention and for further advantages thereof, reference is now made to the following description of the preferred embodiments taken in conjunction with the accompanying drawings in which.

DESCRIPTION OF THE PREFERRED EMBODIMENT

Figure 1:
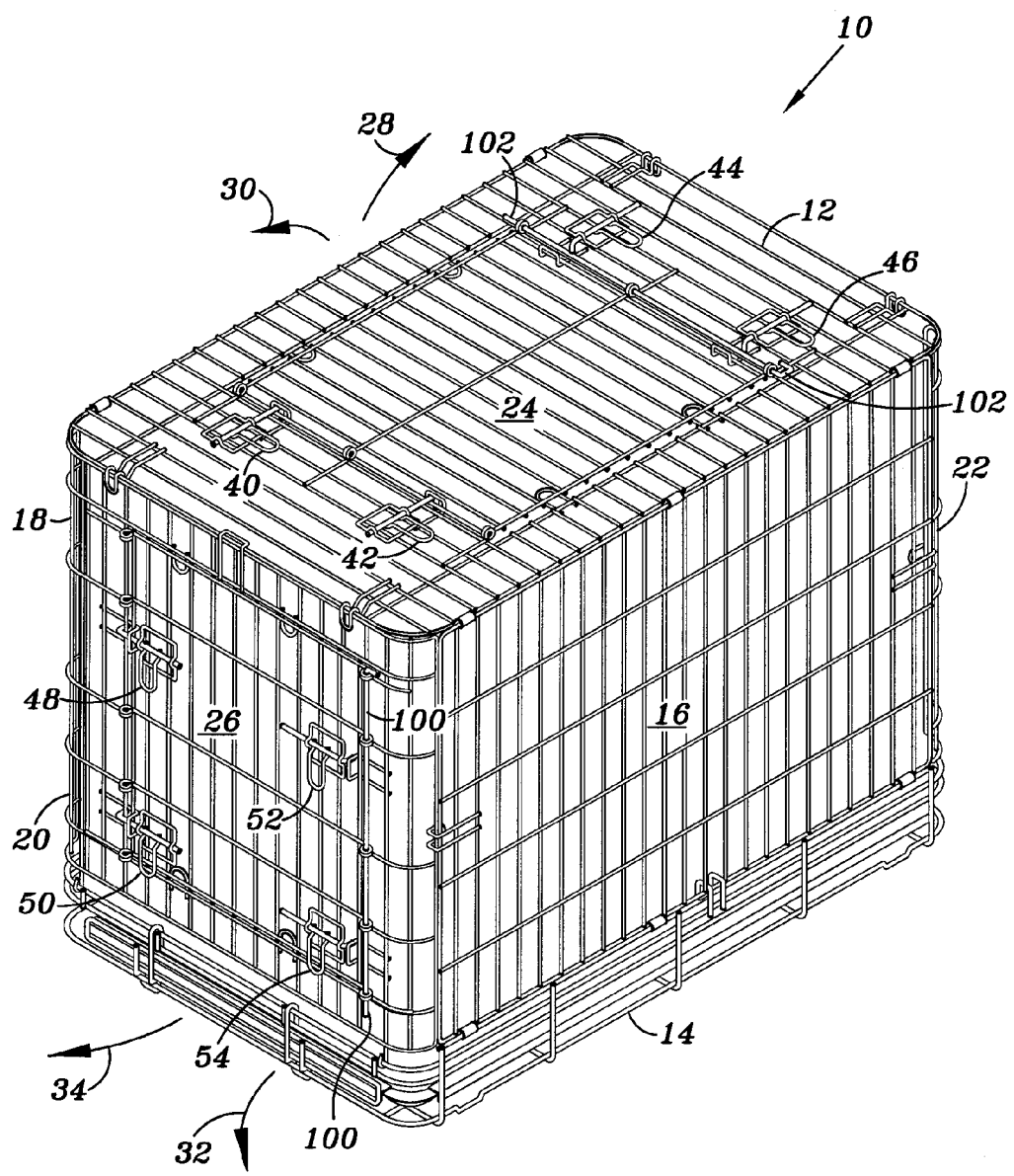
FIG. 1 is a perspective view of the present cage.
Figure 2:
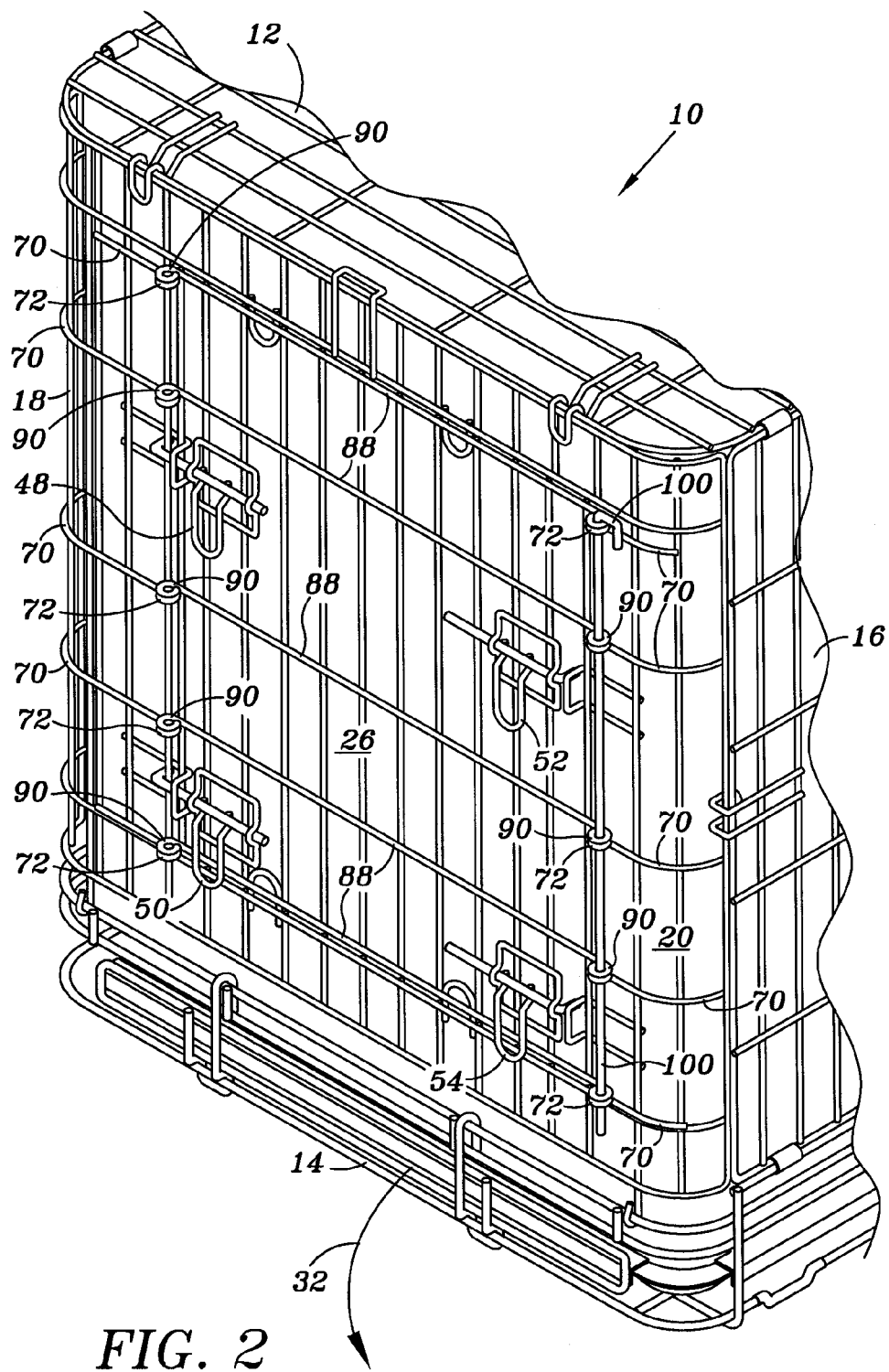
FIG. 2 is an enlarged perspective view of the front wall of the cage shown in FIG. 1 with the door mounted for movement to the right side of the doorway.

Referring simultaneously to FIGS. 1 and 2, the present cage is illustrated, and is generally identified by the numeral 10. Cage 10 includes a top wall 12 and a bottom 14 spaced apart from top wall 12. Cage 10 further includes a first sidewall 16 and a second sidewall 18 spaced apart from sidewall 16. Cage 10 further includes a front wall 20 and a spaced apart rear wall 22. Either one or more of walls 12, 16, 18, 20 and 22 may include a door such as, for example, door 24 disposed within top wall 12 and a door 26 disposed within front wall 20 of cage 10. In accordance with the present invention, doors 24 and 26 are hingedly mounted for swinging movement in either of one or two directions. For example, door 24 mounted within top wall 12 of cage 10 is electively mounted for swinging movement in either of the directions indicated by arrows 28 and 30. Door 26 is hingedly mounted for swinging movement in the direction of either arrow 32 or arrow 34. As shown in FIG. 1, door 24 is mounted for movement in the direction of arrow 28 whereas door 26 is mounted for movement in the direction of arrow 32.

Doors 24 and 26 are secured to cage 10 utilizing a plurality of latches. Latches 40 and 42 are used to secure door 24 to top wall 12 when door 24 is mounted for movement in the direction of arrow 28 as shown in FIG. 1. Latches 44 and 46 are utilized to secure door 24 to top wall 12 when door 24 is mounted for movement in the direction of arrow 30. Latches 48 and 50 are utilized for securing door 26 to front wall 20 of cage 10 when door 26 is mounted for movement in the direction of arrow 32 as shown in FIG. 1. Latches 52 and 54 are utilized for securing door 26 to front wall 20 when door 26 is mounted for movement in the direction of arrow 34. Latches 40, 42, 44, 46, 48, 50, 52 and 54 are more fully described in U.S. Pat. No. 6,681,720, which description is incorporated herein by reference.

The latches associated with door 24 may be mounted either to door 24 or to top wall 12 as illustrated in FIG. 1. Alternatively, latches 40, 42, 44 and 46 may be mounted directly to door 24 as are latches 48, 50, 52 and 54 shown being mounted to door 26. Alternatively, latches 48, 50, 52 and 54 may be mounted to front wall 20 of cage 10.

Figure 3:
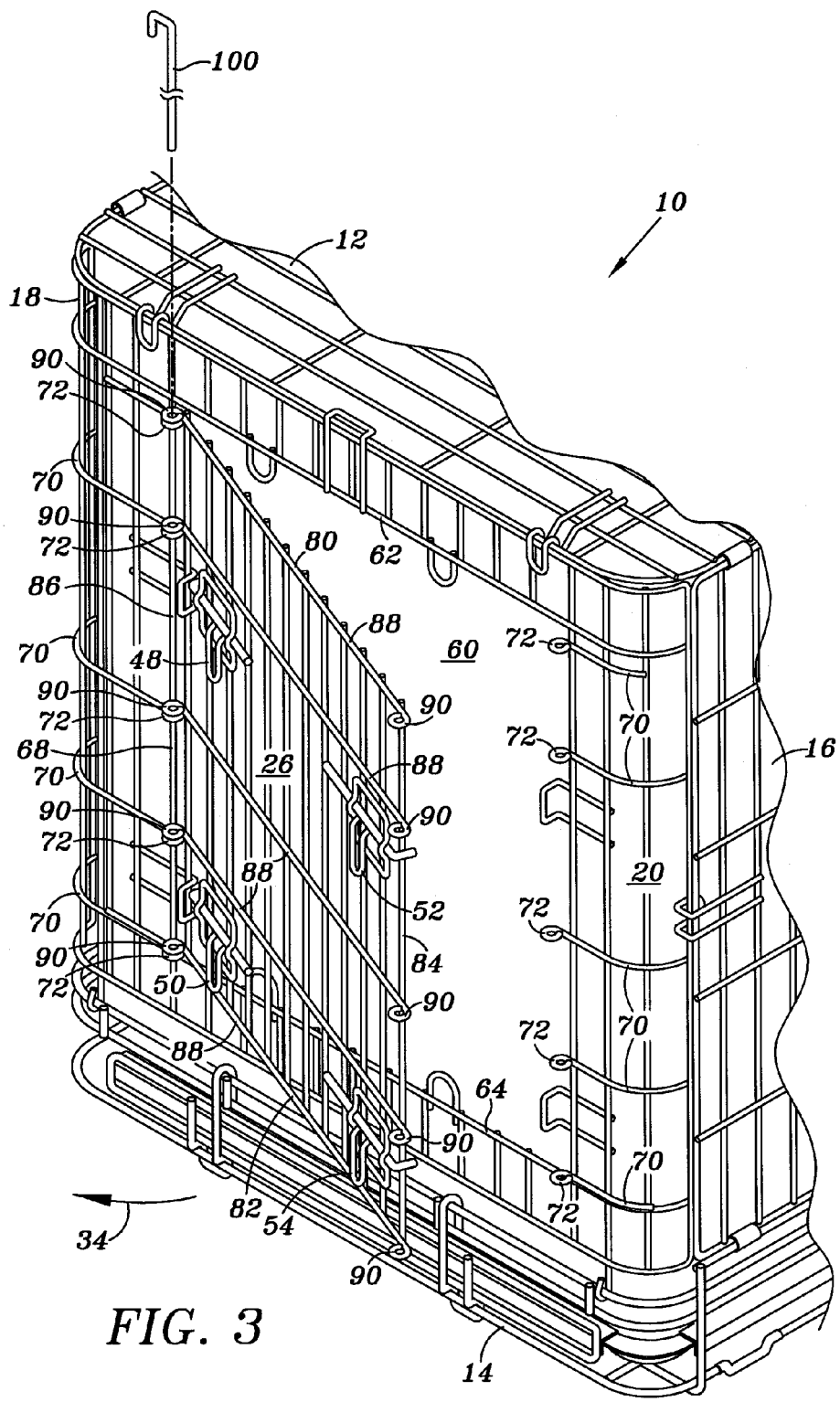
FIG. 3 is an enlarged perspective view of the front wall of the cage shown in FIG. 1 with the door mounted for movement to the left side of the doorway.

Referring simultaneously to FIGS. 2 and 3, front wall 20 of cage 10 is illustrated with door 26 being selectively mounted for rotation in the direction of arrow 32 (FIG. 2) or in the direction indicated by arrow 34 (FIG. 3). Front wall 20 includes a doorway 60. Doorway 60 includes a top edge 62, bottom edge 64, a first side edge 66 and second side edge 68. Doorway 60 receives door 26, and door 26 is mounted for movement between an open position as shown in FIG. 3 and a closed position as shown in FIG. 2. Door 26 is completely removable from doorway 60.

Front wall 20 of cage 10 includes a plurality of spaced apart bars 70. Bars 70 terminate in a loop 72 adjacent to first side edge 66 and second side edge 68 of doorway 60.

Door 26 includes a top edge 80, a bottom edge 82, a first side edge 84 and a second side edge 86. Door 26 includes a plurality of spaced apart bars 88 extending between edges 84 and 86. Bars 88 terminate in a loop 90 along edges 84 and 86 of door 26.

Loops 90 of door 26 are positionable adjacent to loops 72 of wall 20 when door 26 is positioned within doorway 60, such that pairs of loop 72 and 90 form hinges along edge 66 of doorway 60 and along edge 84 of door 26 or along edge 68 of doorway 60 and edge 86 of door 26.

A hinge pin 100 (FIG. 2) is selectively insertable into loop pairs 72 and 90 to mount door 26 to either the position shown in FIG. 2 for swinging movement in the direction of arrow 32 or for swinging movement in the direction of arrow 34 as shown in FIG. 3. Hinge pin 100 secures door 26 along first side edge 66 of doorway 60 as shown in FIG. 2 or alternatively along second side edge 68 of doorway 60 as shown in FIG. 3. Latches 48 and 50 are utilized for securing door 26 to wall 20 (FIG. 2) whereas latches 52 and 54 are utilized for securing door 26 to wall 20 in the embodiment shown in FIG. 3.

Door 24 mounted to top wall 12 of cage 10 is similarly mounted utilizing a hinge pin 102 (FIG. 1) in either the position shown in FIG. 1 for door movement in the direction of arrow 28 or in the opposite position along door 24 for movement in the direction of arrow 30.

Although doors 24 and 26 have been illustrated in the Figures as being mounted in top wall 12 and front wall 20, respectively, it is understood that reversibly mounted doors can also be mounted within rear wall 22 and or sidewalls 16 and 18 of cage 10.

I claim:

1. A cage for housing an animal, the cage comprising:
   a top wall;
   a bottom spaced apart from said top wall;
   first and second spaced apart sidewalls;
   a front wall;
   a rear wall spaced apart from said front wall;
   a door disposed in at least one of said walls and being hinged for movement between an open and closed position;
   said wall containing said door including a doorway for receiving said door, said doorway wall including a top edge, bottom edge and first and second side edges;
   said doorway wall including a plurality of spaced apart wall bars, ones of said wall bars adjacent said first and second edges of said doorway wall include a loop;
   said door having a top edge, bottom edge and spaced apart first and second side edges;
   said door including a plurality of spaced apart door bars extending between said first and second side edges of said door, ones of said door bars including a loop at said first and second side edges of said door;
   said door bar loops being positionable adjacent said doorway wall bar loops when said door is disposed within said doorway, such that said door bar loops on said first edge of said door are aligned with said doorway wall bar loops adjacent said first edge of said doorway wall;
   a hinge pin selectively insertable into one of either said door bar loops on said first edge of said door together with said doorway wall bar loops adjacent said first edge of said doorway wall or either into said door bar loops on said second edge of said door together with said doorway wall bar loops adjacent said second edge of said doorway wall, to thereby hingedly mount said door to said doorway wall for door swinging movement in either a first direction or a second direction with respect to said doorway wall.

2. The cage of claim 1 and further including a latch for securing said door to said doorway wall.

3. The cage of claim 2 wherein said latch is mounted to said door for engaging said doorway wall.

4. The cage of claim 2 wherein said latch is mounted to said doorway wall for engaging said door.

* * * * *